(No Model.)

F. H. RICHARDS.
WEIGHING MACHINE.

Patented Aug. 31, 1897.

Fig. 1.

Witnesses
Chas. T. Stanel
Fred. J. Dole

Inventor
F. H. Richards (No Model.) 7 Sheets—Sheet 2.

F. H. RICHARDS.
WEIGHING MACHINE.

No. 589,290. Patented Aug. 31, 1897.

Fig. 2.

Witnesses
Chas. F. Schmelz
Fred. J. Dole.

Inventor
F. H. Richards.

(No Model.)  7 Sheets—Sheet 3.

F. H. RICHARDS.
WEIGHING MACHINE.

No. 589,290.  Patented Aug. 31, 1897.

*Fig. 3.*

Witnesses:
Chas. F. Schmelz
Fred. J. Dole.

Inventor
F. H. Richards.

(No Model.) 7 Sheets—Sheet 6.

F. H. RICHARDS.
WEIGHING MACHINE.

No. 589,290. Patented Aug. 31, 1897.

Witnesses
Chas. F. Schmelz
Fred. J. Dole

Inventor
F. H. Richards (No Model.) 7 Sheets—Sheet 7.

F. H. RICHARDS.
WEIGHING MACHINE.

No. 589,290. Patented Aug. 31, 1897.

Witnesses
Chas. T. Schmelz
Fred. J. Dole.

Inventor
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 589,290, dated August 31, 1897.

Application filed March 17, 1897. Serial No. 628,035. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, one object of the invention being to furnish a weighing-machine embodying a load-receiver supported to have vertical reciprocatory movements and also intermittent advancing movements in the arc of a circle to receive and discharge the load, and which load-receiver is furnished with a series of circumferentially-disposed closers normally locked in their closed positions, and to provide, in connection with said load-receiver, means operated by the beam mechanism of the weighing-machine for controlling the intermittent advancing movements of said receiver.

A further object of the invention is to provide, in connection with the rotative load-receiver of a weighing-machine, improved force-feeding and agitating apparatus organized to supply a stream of material to the load-receiver at one side the axis of rotation of said receiver to facilitate successive advancing rotative movements of said receiver by the weight of the load at one side the axis thereof, and to provide, in connection with a feeder of the supply apparatus, improved means controlled by the beam mechanism of the weighing-machine for regulating the supply of material and for cutting off such supply just preceding each intermittent rotative movement of the load-receiver.

A further object of the invention is to furnish, in connection with a load-receiver supported for intermittent rotative movement and having a series of circumferentially-disposed closers, means for retaining the closers in their normal positions; means for controlling the intermittent rotative movements of the load-receiver; a gravitative regulator located below the load-receiver in position to receive the discharged load; means controlled by the regulator, on the descending and ascending movements thereof, for imparting opening and closing movements, respectively, to two independent closers located, respectively, above and below the axis of rotation of the load-receiver.

In the drawings accompanying and forming part of this specification.

In a general way the framework and the beam mechanism supported thereon are similar to the framework and beam mechanism shown and described in Letters Patent of the United States No. 574,169, dated December 29, 1896, and as shown and described in divers patents heretofore granted to me.

The framework for carrying the various parts of the machine may be of any suitable construction and in the form shown in the drawings comprises a suitable base or floor plate 3 and two end frames 2 and 4 rising therefrom, which end frames 2 and 4 are joined at their upper ends by a top plate or beam 5, which supports the hopper or supply-chute H for containing the mass of material to be supplied to the load-receiver.

Figure 1:
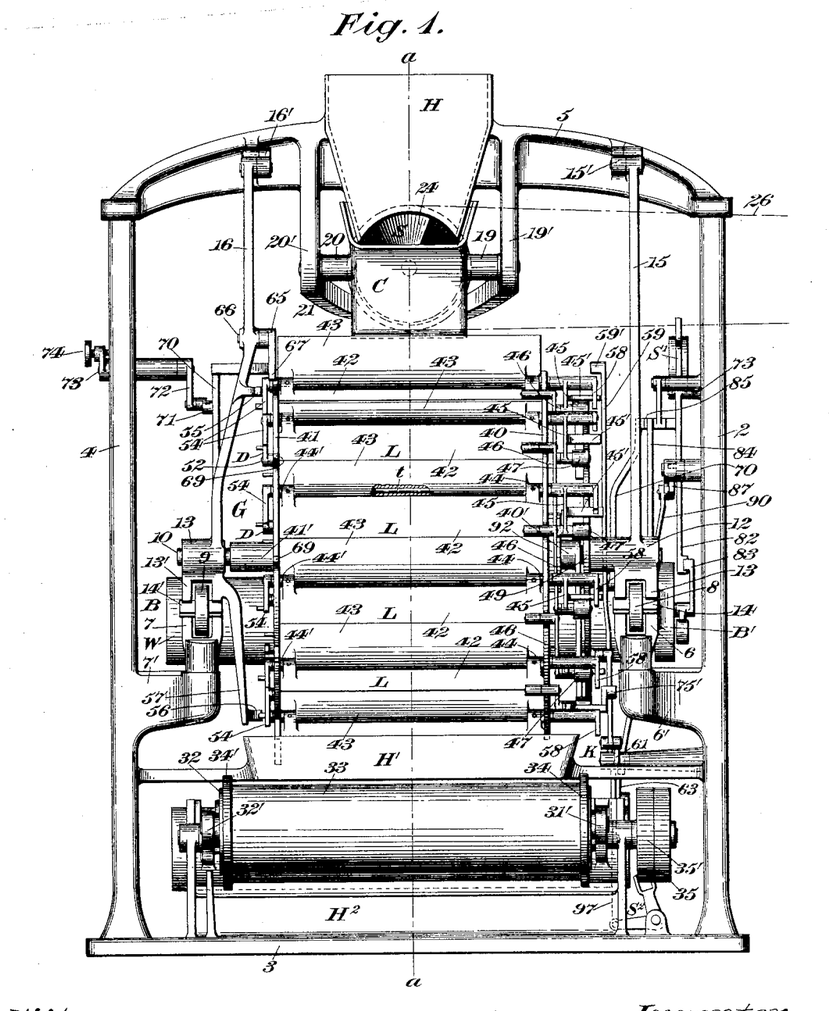
Figure 1 is a front elevation of a weighing-machine embodying my present improvements.

The end frames 2 and 4 are herein shown carrying some suitable beam-supports, such as the V-shaped bearings 6 and 7, supported on brackets 6' and 7', respectively, extending inward from said frames, as shown in Fig. 1, which bearings are adapted for supporting the beam mechanism.

The beam mechanism which supports the load-receiver, which is designated in a general way by G and which will be hereinafter fully described, comprises a scale-beam B, consisting of two beam-arms 8 and 9, joined together at their outer ends by a counterweight W, which is in the nature of a connecting-shaft. These beam-arms 8 and 9 are furnished with transversely-disposed knife-edge pivots 8' and 9', located some distance from the inner poising ends thereof and fulcrumed upon the V-shaped bearings 6 and 7, respectively. In the present instance the load-receiver G, which is carried at the poising or inner end of the scale-beam and which is in the nature of a cylinder or drum, is arranged to have oscillatory movements in a vertical direction with the beam mechanism and also to have intermittent advancing movements in the arc of a circle independent of such oscillatory movements.

As a means for supporting the load-receiver to facilitate oscillatory and advancing movements thereof said load-receiver is furnished with a horizontally-disposed shaft or axle 10, journaled at opposite ends thereof in hubs 12 and 13, having depending bearings 12' and 13', which are supported upon knife-edge pivots 14 and 14', respectively, carried on the inner or poising ends of the beam-arms 8 and 9 of the scale-beam B. Thus it will be seen that the load-receiver has two axes of movement, the axis of rotation of the load-receiver being located somewhat above the axis of oscillation thereof, and as a means for insuring the oscillatory movement of the load-receiver in a vertical line, or substantially so, during the movements of the beam mechanism I have shown the hubs 12 and 13 furnished with upwardly-extending arms 15 and 16, which are pivotally connected at their upper ends by means of links 15' and 16', respectively, to the upper end of the framework of the weighing-machine.

As a means for force-feeding material to the load-receiver and simultaneously agitating the same I have provided what may for convenience be herein termed the "force-feeding" and "agitating" apparatus, and which is designated in a general way by F. One element of the force-feeding and agitating apparatus in the preferred form thereof shown most clearly in Figs. 2 and 3 of the drawings comprises an elongated horizontally-disposed feed-case C, which is in the nature of a parti-cylindrical spout having a discharge-opening 17 at the forward end thereof, which is located above and in the rear of the axis of rotation of the load-receiver G, and also having an inclined front wall 18, extending upward from the front edge of the discharge-opening 17. This feed spout or case preferably has trunnions 19 and 20 at opposite sides, respectively, thereof, which are pivotally supported in bearings 19' and 20' of a feed-case-supporting bracket 21, preferably constituting a part of and depending from the top plate 5 of the framework.

The feed-case C is shown open at the top and extends considerably forward of the supply-chute H, which depends into said feed-case at the rear end thereof.

Another element of the force-feeding or agitating apparatus consists of a rotative force-feeder S, which is shown as a feed-screw, the shaft 22 of which is journaled in an elongated bearing 23 on the rear wall 18' of the feed-case, which bearing is shown extended for a considerable distance within the feed-case for the purpose of providing a long support for the feed-screw. The blade 24 of the feed-screw is of sufficient diameter and is so disposed as to act as a cut-off for preventing the entrance of material to that portion of the feed-case in advance of the supply-chute when said screw is at rest, as will be understood by reference to Fig. 3 of the drawings.

Other elements of the force-feeding and agitating apparatus comprise feed-screw-actuating mechanism and a feed-case and a feed-screw-agitating device. The feed-screw-actuating mechanism may consist, as shown in the drawings, of a driving-pulley 25, fixed to the outer end of the feed-screw shaft 22, driven by a belt 26 (shown in dotted lines) through any suitable source of power (not shown) and a loose pulley 25', mounted upon said shaft.

Figure 2:
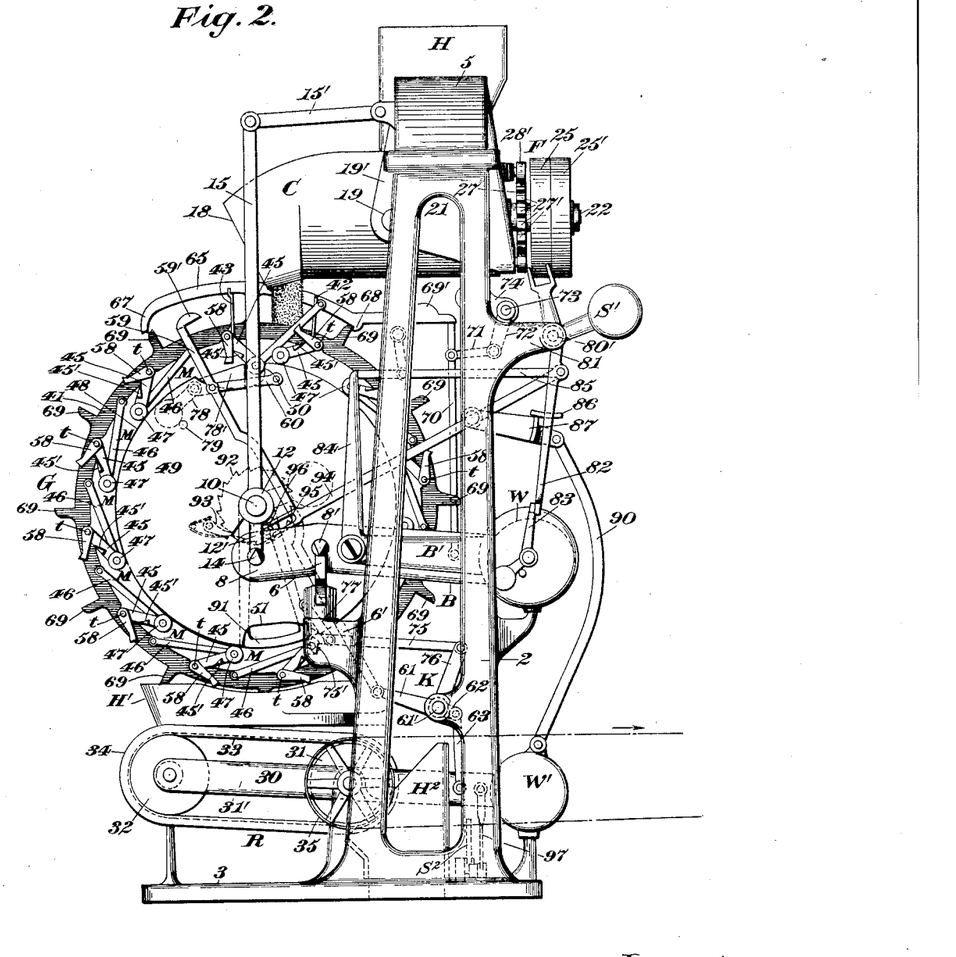
Fig. 2 is a side elevation of the weighing-machine as seen from the right in Fig. 1 and showing the parts in their normal positions—that is, the load-receiver is in its elevated load-receiving position with the upper set of closers open and the lower set of closers locked against movement—said figure also showing the regulator in its elevated load-receiving position and the load-receiver locked by the counterweighted escapement-lever against accidental rotative movement.
Figure 3:
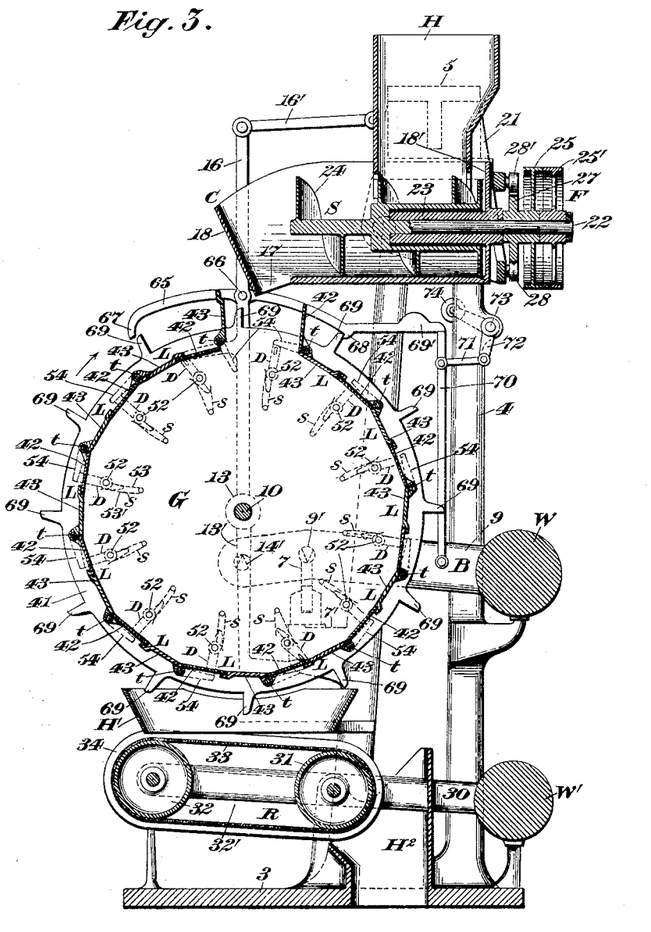
Fig. 3 is a central longitudinal section of the weighing-machine, taken in dotted line *a a*, Fig. 1, as seen from the right in said figure, and showing the parts in the positions illustrated in Fig. 2.

The agitating device in the form thereof shown most clearly in Figs. 2 and 3 of the drawings comprises an agitator-wheel 27, preferably formed integral with the hub of the driving-pulley, said wheel having a series of tooth-like projections 27' on the periphery thereof and being preferably located between two peripherally-disposed bearing-rollers 28 and 28', respectively, journaled on studs secured to the bracket 21, on which the feed-case C is pivotally supported, the lower roller 28 constituting a support for the wheel 27, and the upper roller 28' simply limiting the vibratory movement of said wheel as successive projections or undulations 27' ride over the lower roller 28.

It is desired to state in the above connection that any suitable means for effecting a vertical vibratory movement of the feed-screw and feed-case during the rotation of said screw may be provided in lieu of the agitating device shown in the accompanying drawings without departure from my present invention.

The peripheral undulations of the agitator-wheel 27 will be of relatively shallow depth, so that the vertical vibratory movement of the feed-screw will be correspondingly slight, although sufficient to properly agitate and disseminate the material as it is force-fed through the feed-case C.

Located below the load-receiver G in position to receive the load as it is discharged from said load-receiver is a regulator or discharge-conveyer, (designated in a general way by R.) This regulator, as will be hereinafter fully described, performs several functions and is the controlling medium for certain elements of both the load-receiver and the force-feeding and agitating apparatus.

Figure 4:
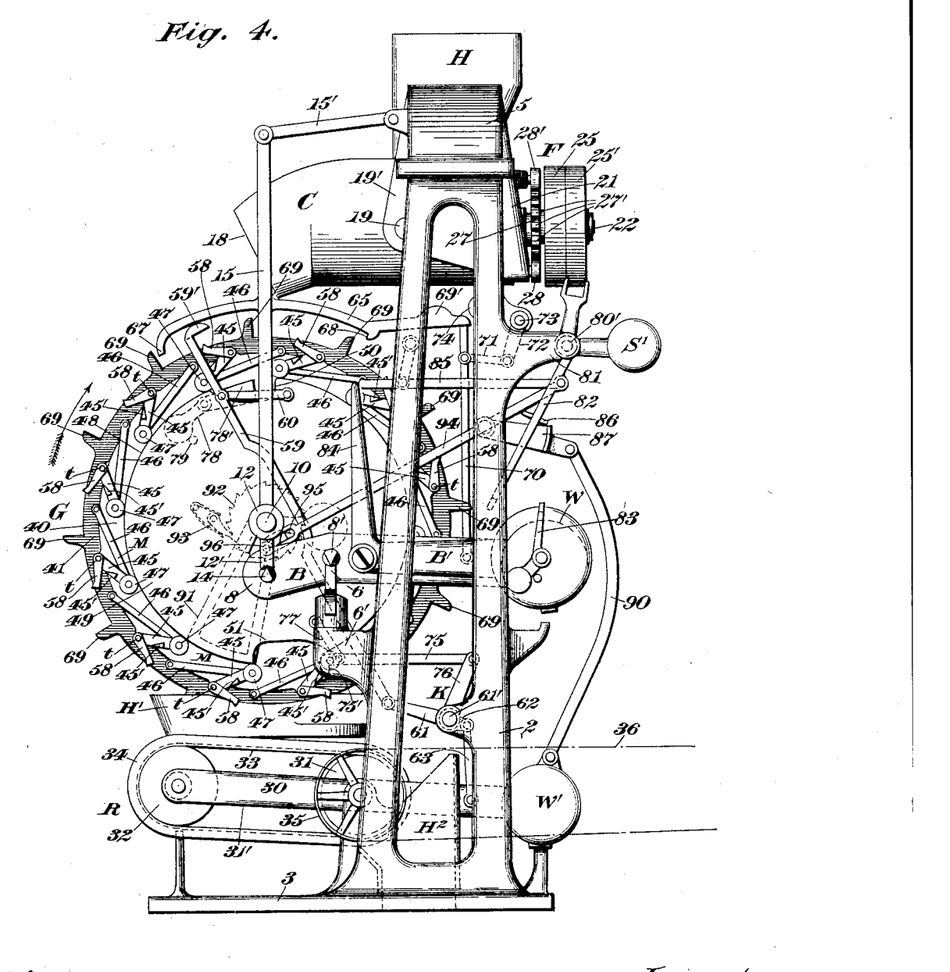
Fig. 4 is a side elevation similar to Fig. 2, showing the load-receiver in the position it occupies just preparatory to the opening of the lower closer and preparatory to the discharge of its contents, the escapement-lever being shown in the position it occupies during the intermittent rotative movement of the load-receiver. In this figure the means which controls the opening movement of the upper set of closers is shown in position to engage and open said closers on the descent of the regulator. In these positions of the parts the supply to the load-receiver is stopped.

The regulator in the preferred form thereof shown most clearly in Figs. 2, 3, and 4 of the drawings comprises a counterweighted carrier or frame 30, pivotally supported intermediate the ends thereof in bearings, preferably constituting an integral portion of the base 3 of the framework, two belt-carrying drums 31 and 32, journaled in arms 31' and 32' of the regulator-frame 30, one preferably coincident with the pivotal point of said frame and the other at the poised end of said frame, and a load-receiving belt 33, extending from the two drums 31 and 32. This belt, which may be of any suitable material, is preferably furnished with side flanges 34 and 34', adapted to prevent the material from running off of the belt at the side edges thereof. The regulator-frame preferably comprises two parallel arms 31' and 32', one of which extends rearwardly of the pivotal point of said frame and is furnished with a counterweight W' for retaining the free or poised end of said frame normally in a slightly-elevated position, as illustrated in Figs. 2 and 3 of the drawings, the plane of the load-receiving belt being slightly inclined downwardly toward the rear end thereof when the regulator is elevated or in position to receive the load.

As a means for driving the belt of the regulator to advance the material as the same falls thereon from the load-receiver the shaft of the drum 31 is shown furnished with fast and loose pulleys 35 and 35', respectively, which may be driven from any suitable source of power (not shown) by means of a belt, such as shown at 36 in dotted lines in Figs. 2 and 4.

Located between the load-receiver and the regulator is a chute H' for guiding the material in transit from the load-receiver to the belt of the regulator, and located in juxtaposition to the discharge end of the regulator or discharge-conveyer is a chute $H^2$, which is adapted to receive the material as it is discharged from the regulator and conduct the same to a suitable place of deposit.

The load-receiver G, which, as before stated, is in the nature of a drum supported for rotative movement on the shaft or axle 10, comprises two end walls 40 and 41, having outwardly-extending bearings or hubs 40' and 41', respectively, supported on the said shaft or axle, a cylindrical body portion comprising a series of circumferentially-disposed pivotally-supported pairs of closers arranged in a circuit substantially concentric to the axis of rotation of the receiver and connecting the two end walls, and an actuating-connector M between the two closers of each pair of closers, all of which will be hereinafter more fully described. Each pair of closers is designated in a general way by L, and the two closers of each pair are designated by 42 and 43, respectively.

Figure 11:
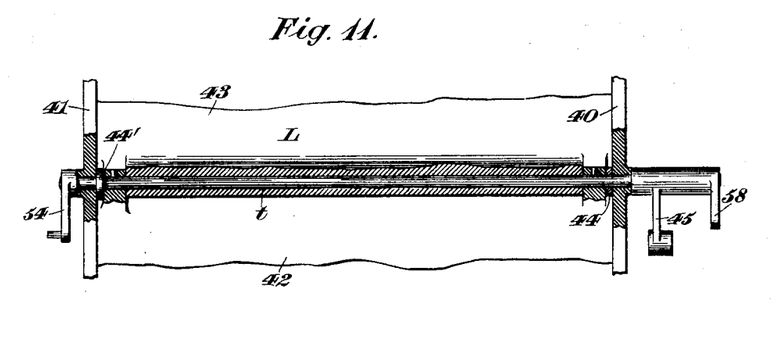
Fig. 11 is a transverse section of a portion of the load-receiver, partially in elevation, showing the manner in which the end walls of the receiver are connected together and also showing the closer and actuating-shaft or tie-rod and certain elements in connection with said tie-rod.

The two closers 42 and 43, constituting a pair of closers, are pivotally supported at their outer ends and have their inner ends preferably in overlapping relation, as shown most clearly in Fig. 3 of the drawings, and for the purpose of supporting said closers the load-receiver is shown furnished with a series of closer-shafts or tie-rods, each of which is designated by $t$ and each of which is preferably journaled at opposite ends for rocking movement in bearings formed in the two end walls 40 and 41, respectively, of said receiver. The tie-rod of each closer is furnished at opposite ends thereof with circumferential flanges 44 and 44', (see Fig. 11,)

which bear against the inner faces of the two end walls 40 and 41 and hold said end walls in proper relation one with the other. In practice one closer, as 42, of one pair of closers will be fixedly secured to a tie-rod, and the adjacent closer, as 43, of the next adjacent pair of closers will be pivotally supported upon the same rod, so that as one tie-rod is rocked in the manner hereinafter described one closer of one pair of closers will move therewith and be opened or closed thereby, and the adjacent closer of the same pair of closers will, through the actuating-connector M, have a corresponding movement without effecting any movement of the closers adjacent to this actuated pair of closers, thus permitting the successive pairs of closers to be operated independent of each other.

Figure 6:
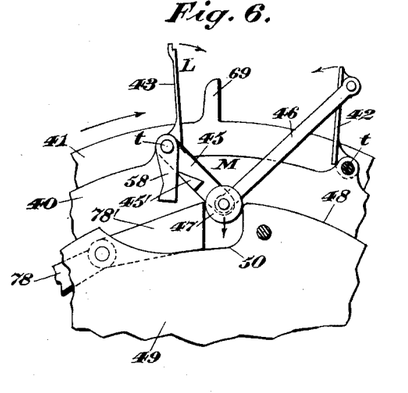
Fig. 6 is a side elevation, on a relatively large scale, of a portion of the load-receiver mechanism, showing the upper pair of closers in an open position and locked as against accidental closing movements.
Figure 7:
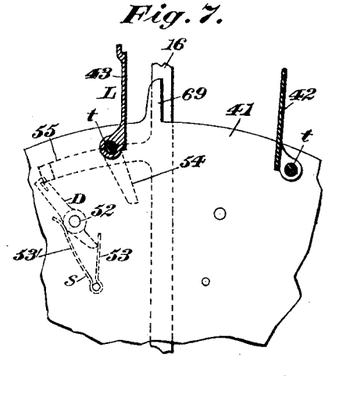
Fig. 7 is a central vertical section of a portion of the upper end of the load-receiver on a scale similar to that of Fig. 6 and showing in full lines the upper pair of closers open and also showing in dotted lines the closer-holding latch or detent device tripped by the detent-actuator and thrown out of engagement with the crank-arm of the closer.
Figure 8:
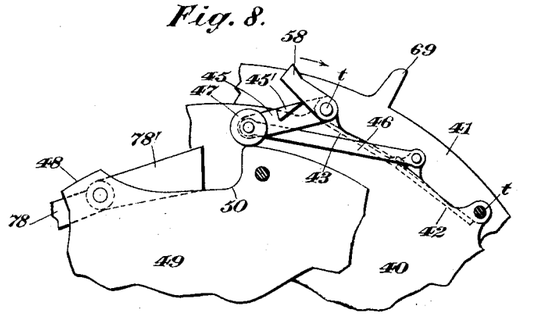
Fig. 8 is a view similar to Fig. 6 of a portion of the load-receiver mechanism, showing the actuating-connector between the two closers of the upper pair of closers in the positions they occupy after the load-receiver has advanced beyond the position shown in Fig. 6 to shut the closers.
Figure 9:
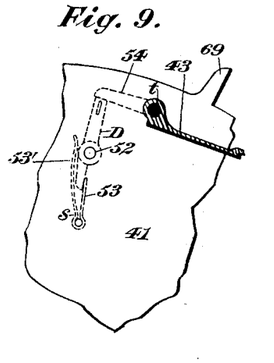
Fig. 9 is a view similar to Fig. 7, showing one closer in its closed position and showing in dotted lines the detent device in position to return the closer in such position.
Figure 10:
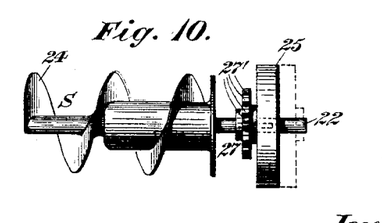
Fig. 10 is a side view of the feed-screw and a portion of the actuating elements in connection therewith.

The actuating-connector M between the two closers of each pair of closers comprises in the preferred form thereof in the drawings two links 45 and 46, pivotally connected together at their inner ends between the axis of the load-receiver and the pivotal points of said closers, the one, 45, being fixedly secured to the tie-rod or rock-shaft of the "actuating-closer" 42, and the one, 46, being pivotally connected at its outer end to the "actuated" closer 43 near the upper end of said closer, as most clearly illustrated in Figs. 6 and 8 of the drawings. As shown in the drawings, this actuating-connector M is in the nature of a toggle and is furnished at the knuckle thereof with an antifriction-roller 47, which when the closers are in their closed positions bears upon a track 48, shown as the periphery of a substantially circular plate 49, which plate is shown in Fig. 1 fixed to the hub 12 in which the axle or shaft 10 is supported and is held as against rotative movement and constitutes a stop-plate for preventing the accidental opening movement of the closers during the major portion of the rotative movement of the load-receiver.

The track-face 48 of the stop-plate 49 has two depressed or "let-off" portions 50 and 51, respectively, located one at the upper portion of the track in position to permit a closer-opening movement of an upper pair of closers when the same arrive at a point below the discharge end of the feed-case C and to also assist the closing movement thereof and the depressed portion being located at the lower portion of said track in position to permit a closer-opening movement of the actuating-connector of a pair of closers when said pair of closers arrive in the proper position to discharge the load to the regulator or discharge-conveyer R.

Figure 12:
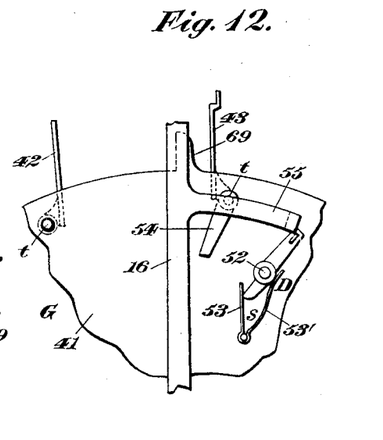
Fig. 12 is an end view of a portion of the load-receiver, partially in section, showing the parts illustrated in full and dotted lines in Fig. 7 as seen from the opposite end of the load-receiver.
Figure 13:
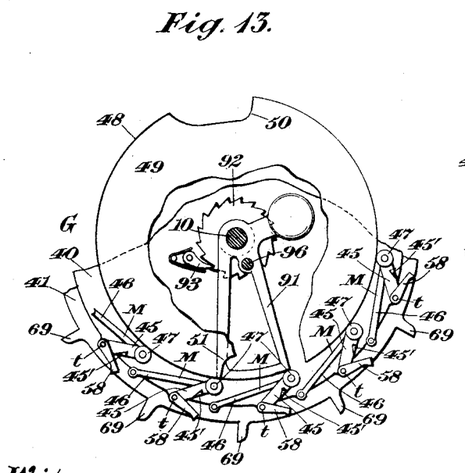
Fig. 13 is an end view, partially in section, of a portion of the load-receiver, showing the counterweighted interlock which prevents the accidental opening movement of the lower closers and also showing the pawl and ratchet-wheel which limits the movement of the interlock in one direction.

From the foregoing it will be seen that the closers, through the medium of their actuating-connectors and the closer-plate, are positively locked against opening movement during the rotation of the load-receiver except at such times as they arrive in juxtaposition to the depressions or the let-off portions of the track 48 of the stop-plate; and as it is necessary to retain the successively-advancing closers in a closed position for a predetermined length of time after said closers have arrived in juxtaposition to said depressions it has been deemed necessary to provide, in addition to the stop-plate 49, independent detent devices or latches, such as designated by D, in operative relation with each pair of closers, and to so construct and organize said detent devices that each device will lock a pair of closers normally in their closed positions until released by a detent-actuator preferably at predetermined points in the rotative movement of the load-receiver. This closer-locking-detent device in the preferred form thereof shown most clearly in Fig. 12 of the drawings is in the nature of a latch pivotally supported at 52 on the end wall 41 of the load-receiver and held normally in its closer-locking position and substantially radial to the axis of the load-receiver by means of a spring s, fixed to the wall of the load-receiver and engaging the lower end of said latch, such spring being shown having two arms 53 and 53' engaging opposite sides of said detent. The outer free end of the detent or latch D engages the inner face of a crank-arm 54 on the tie-rod or rock-shaft $t$ of the actuating-closer 42, which crank-arm extends outward from the tie-rod in an opposite direction to and substantially in parallelism with said closer 42, as illustrated in the figure referred to. The inner free end of this closer 42 preferably overlaps the inner free end of the actuated closer 43 when said closers are in the closed position illustrated in Figs. 3 and 8, and consequently prevents the accidental opening movement of the actuated closer 43 in advance of the same movement of the actuating-closer 42.

The means for releasing the detent devices at predetermined points in the rotative movements of the load-receiver comprise in the preferred form thereof shown in the drawings two oppositely-disposed actuating-arms 55 and 56, having projections located in the path of movement of the outer ends of the detent devices D, one above and one below the axis of rotation of the receiver, the detent-actuating arm 55 preferably constituting a part of the upwardly-extending arm 16 of the hub 13 and extending outward toward the rear of the load-receiver, and the other actuating-arm 56 constituting a part of a depending arm 57 on the hub 13, which supports the load-receiver and extending toward the rear edge of said load-receiver, (see Figs. 1, 3, and 12,) the upper actuating-arm 55 being located in position to engage a detent when a pair of closers is in juxtaposition to the feed-case, so as to release and facilitate an opening movement of the closers, and the other detent-actuating arm 56 being located in position to engage the detent to release a pair of closers when said pair of closers approaches a position in vertical alinement with the axis of the receiver, as will be readily understood by a comparison of the several figures of the drawings.

As a means for actuating the successive pairs of closers as each arrives in juxtaposition to the discharge end of the feed-case of the load-supplying means the tie-rod or rock-shaft of each actuating-closer is furnished with a crank-arm 58, which, when said pair of closers arrives in close proximity to the discharge end of the feed-case, extends outwardly in substantially a horizontal plane, as indicated in Fig. 4 of the drawings, and a closer-opening actuator 59 is provided, which in the present instance is in the nature of a rod having a hook or projection 59' at the upper end thereof, which hook is located normally above and in position to engage the crank 58 on the descending movement of the actuator and operate said crank to open the actuating-closer and through the actuating connector M the adjacent closer of the same pair of closers. This closer-opening actuator 59 is held with its working end in operative position with relation to the crank-arm of the successive closers by means of a link 60, pivoted at one end to the actuator 59 and at its opposite end to the stop-plate 49 and is pivotally connected at its lower end to one arm 61 of a bell-crank K, pivotally supported at 61' on an upright of the framework, and which crank has an oppositely-disposed crank-arm 62, which is pivotally connected, by means of a link 63, to the counterweighted end of the regulator R, the dispositions of the crank-arms and their connections with the actuator and regulator being such that on the descending movement of the load-receiving end of the regulator a closer-opening movement will be imparted to the closer-opening actuator, as will be understood by reference to Figs. 4 and 5 of the drawings.

It will be understood that the detent-actuating arm 55 is so located as to release the detent just before the closer crank-arm 58 arrives in position to be operated by the actuator 59.

In the organization of mechanism herein described the successive pairs of closers will have an opening movement to discharge the load as they successively arrive at their load-discharging positions above and adjacent to the regulator R, said closers, when they arrive in this position, being preferably opened by the weight of material resting thereon, and means being provided for blocking the load-discharging movement of the closers until the load-receiver has come to a proper overpoise position and the supply to the load-receiver has been cut off by the stopping of the rotation of the force-feed or feed-screw S, which means will be hereinafter fully described.

As will be understood by reference to Figs. 2 and 4 of the drawings, the load-receiver is supported for rotative movement with its axis slightly in advance of a vertical line intersecting the discharge-opening 17 of the feed-case, so that the material as it is forced fed into the receiver will have the greater portion thereof deposited at one side of said axis and will, on account of the excessive weight at this side of the axis, cause said receiver, when released, to rotate in the direction of the arrow in each of said figures, means being provided for intermittently locking the receiver against rotative movement and for controlling such intermittent movements.

The means for controlling the intermittent rotative movements of the receiver comprises in the preferred form thereof shown in the drawings an escapement device consisting of a counterweighted escapement-lever 65, pivotally supported intermediate its ends, as at 66, on the upwardly-extending arm 16 of the hub in which the axle 10 of the receiver is journaled and having pallets 67 and 68 located at opposite sides, respectively, of said pivotal support, and a series of radially-disposed escapement-arms located, preferably, on the periphery of the end wall 41 of the receiver and designated each by 69, said arms being preferably equidistantly disposed about such periphery in proper position to be successively engaged by the pallets of the escapement-lever, and for insuring the requisite length of movement at each intermittent rotation of the receiver the distance between said arms is substantially equal to the distance between the tie-rods on which the closers are mounted.

As a means for actuating the escapement-lever to release the closer at a predetermined point in the descending movement of the load-receiver I have provided an escapement-actuator, which is shown as a rod 70 pivotally connected at its lower end to the counterweighted end of the scale-beam B and abutting normally at its upper end against the lower face of the counterweighted end 69' of the escapement-lever 65, and as a means for normally holding the upper end of the actuating-rod 70 in operative relation with the escapement-lever and also permit the same to be thrown out of operative relation with said lever the upper end of the lever is pivotally connected, by means of a link 71, to a crank-arm 72 of a rock-shaft 73, which is furnished with a handle 74 for operating the same, these elements constituting a hand-operable device whereby the upper end of the actuating-rod may be thrown into operative or inoperative relation with the escapement-lever, said actuator being thrown out of operative relation with the escapement-lever when it is desired to test the machine or render it inoperative.

During the operation of the machine the pallet 68 of the escapement-lever is thrown out of engagement with one of the escapement-arms 69 on the load-receiver, which allows a rotative movement of said receiver at each descending movement thereof, and the other pallet 67 is simultaneously thrown into position to engage another arm on the load-receiver to thereby interrupt the rotative movement of said receiver after the same has traveled a predetermined arc distance, this operation being similar to the operation of an ordinary clock-escapement, the load-receiver constituting, as it were, the escapement-wheel and the escapement-lever coöperating with said wheel to control the movements thereof.

In practice it is desirable to impart a closing movement to the open closers at the lower portion of the load-receiver simultaneously with the ascending movement of the load-receiving end of the regulator R, and to accomplish this I have provided a closer-shutting actuator 75 in operative connection with the rocker K, which is connected with the regulator and assists the opening movement of the upper closures. This closer-shutting actuator in the preferred form thereof shown in the accompanying drawings is in the nature of a horizontally-disposed rod having a hook 75' at the forward end thereof in position to engage a catch or projection 45' on the link 45 of the actuating-toggle M when the closers connected by the toggle are in their discharging positions, said closer-shutting actuator being pivotally connected at its rear end to an arm 76 on the rocker K and being held in operative position at its forward end by means, preferably, of a link 77, which is pivotally connected at its lower end to the actuator and at its upper end to the stop-plate 49, the disposition of the arm 76 on the rocker K being such that when the load-receiving end of the regulator rises the hook of the closer-shutting actuator will engage the projection 45' and retract the link 45, thus rocking the closer-shaft and shutting the two closers 42 and 43, the former slightly in advance of the latter.

From the foregoing it will be understood that the regulator on the descending movement thereof effects an opening movement of the upper closures and simultaneously shifts the closer-shutting actuator into position to close the lower closers and that on the ascending movement of said regulator the lower closers are shut by the closer-shutting actuator, and the closer-opening actuator is simultaneously shifted into position to engage and open the next adjacent pair of closers, the effective operation of one actuator shifting the other actuator into a normally operative position, and vice versa, these operations of the two actuators being reciprocally effected by the ascending and descending movements, respectively, of the regulator R, it being impossible to operate one actuator without imparting a return movement to the other actuator to bring the same into an operative position.

Figure 5:
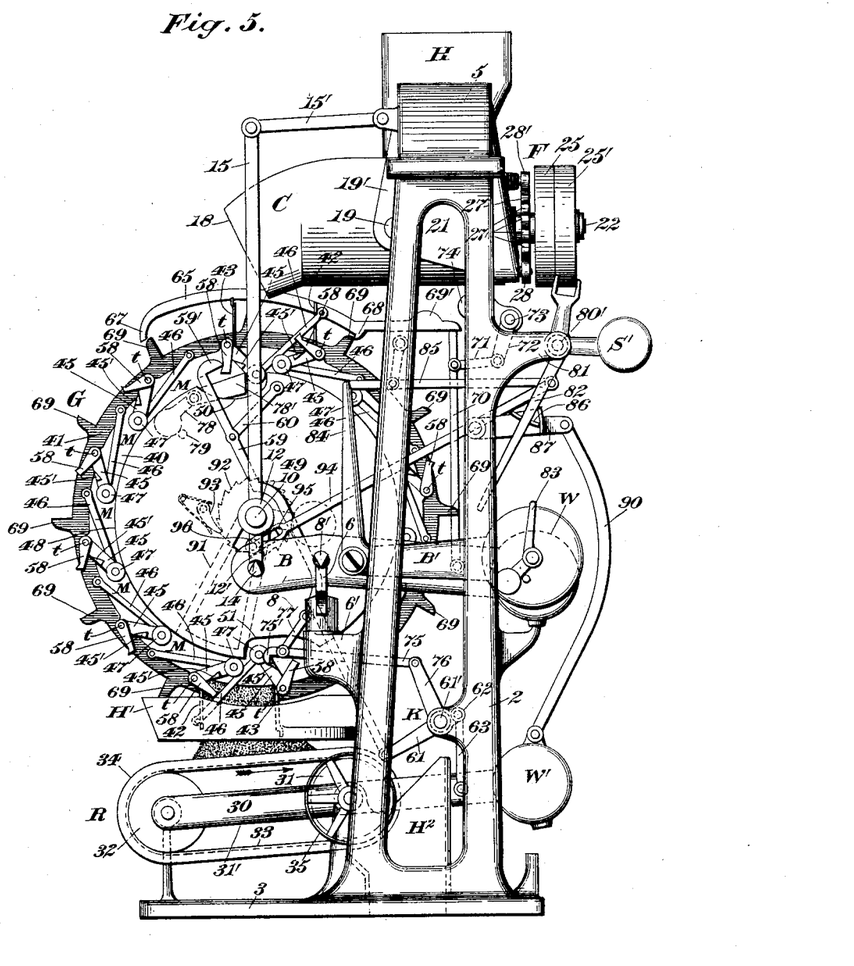
Fig. 5 is a side elevation similar to Figs. 2 and 4, showing the parts of the weighing-machine in the positions they occupy during the discharge of the load from the load-receiver.

As a means for preventing the accidental retractive rotary movement of the load-receiver I have provided in operative relation with the upper depressed portion 50 of the stop-plate a pivotally-supported counterweighted by-pass stop 78, having its upper edge when in the normal position thereof shown in Figs. 2, 4, and 5, inclusive, in position to constitute, practically, a continuation of the track 48 and having its free end 78' in position to engage the side face of the roller of the actuating-toggle when said toggle is in its closer-opening position and hold said toggle against an accidental closer-shutting movement and also prevent a return movement of the load-receiver, the counterweight of said by-pass stop retaining said stop normally in the position shown in said figures and at the same time permitting the toggles to ride over and depress the forward free end thereof, a stop-pin (shown in dotted lines 79) being provided to limit the movement in one direction of said by-pass stop.

As a convenient means for stopping the rotation of the feed-screw S just preceding each intermittent rotative movement of the load-receiver and just preceding the load-discharging movement of the lower pair of closers I have provided in operative relation with the fast and loose pulleys of the feed-screw a feed-controller, which is shown as a counterweighted belt-shipping device, (designated in a general way by S',) pivotally supported at 80' on a bracket 81 at the upper end of the framework and having a depending arm 82, which when the load-receiver is in its normal load-receiving position engages a by-pass 83, carried on a counterweighted lever or auxiliary beam B', pivotally supported on the scale-beam B, as shown in Figs. 1, 2, 4, and 5 of the drawings, which by-pass normally holds the belt-shipper in position to retain the belt 26 (shown in dotted lines in Fig. 1) upon the fast pulley 25 to effect a rotative movement of the feed-screw S, the belt-shipper being retained in this position until the bucket arrives at a predetermined point in the descending movement thereof, when the depending arm will be released from the by-pass, and the counterweight of the belt-shipper will throw said belt-shipper into position to carry the belt onto the loose pulley and stop the operation of the feed-screw, and as a means for actuating the feed-controller and belt-shipper to carry the belt from the loose to the fast pulley the lever B' is furnished at the inner end thereof with an upwardly-projecting arm 84, which bears against the inner end of a horizontally-disposed belt-shipper-actuating rod 85, which is pivotally connected at the outer end to the depending arm 82 of the belt-shipper, said actuating-rod 85 being supported in operative relation with the lever-arm 84 by means of a link pivotally connected to the framework. By this construction and organization of parts it will be seen that immediately upon the descent of the counterweighted lever B, which occurs after the bucket has returned to its normal load-receiving position and the upper closers are open and the lower closers are closed, the lever-arm 84 will shift the belt-shipper-actuating rod 85 outward and throw the belt-shipper into position to start the rotation of the feed-screw.

To prevent the belt-shipper from being actuated by the counterweighted auxiliary beam B' until after the load has been fully discharged and the parts of the load-receiver returned to their normal position and until the regulator has returned to its normal elevated or load-receiving position, I have provided in connection with the regulator R and belt-shipper two reciprocally-effective stop members, (designated by 86 and 87, respectively,) one of said stops, as 86, being carried by the depending arm of the belt-shipper, and the other of said stops being pivotally connected at one end with the framework and at its opposite end by means of a stop-actuating link 90 to the counterweighted end of the regulator, these stops being so constructed and so disposed relatively to one another that when the regulator is in the depressed position (shown in Fig. 5) the stop member 87 of said regulator will engage the stop member 86 and block the movement of the belt-shipper S' and consequently the descending movements of the counterweighted auxiliary beam B' and will hold the belt-shipper in this position until the regulator returns to its elevated or load-receiving position, when the stop member 87 will be carried by the descending movement of the counterweighted end of said regulator below the path of the stop member 86, allowing the counterweighted auxiliary beam B' to descend and shift the belt-shipper from the position shown in Fig. 5 to that shown in Fig. 2.

When the belt-shipper is in the position shown in Fig. 2, the stop member 86, carried thereby, will engage and block the accidental descending movement of the load-receiving end of the regulator and hold said regulator in said position until the auxiliary beam B' is carried upward by the beam mechanism sufficiently to release the by-pass 83 from engagement with the depending arm of the belt-shipper, which movement of the beam mechanism takes place after the load-receiver has come to an overpoise position.

As a means for positively blocking the opening movement of the lower pair of closers until the load-receiver has arrived at its overpoise position and has made a partial rotation to bring the proper pair of closers into the load-discharging position I have provided a counterweighted track segment or stop 91, which is pivotally supported, preferably, coincident with the axis of the load-receiver and has its outer face in position to constitute a continuation of the track 48 of the stop-plate 49, the outer face of the stop-segment normally bridging the lower depression 51 in said track. Fixed to the hub of said track segment or stop is a ratchet-wheel 92, the teeth of which are adapted to be engaged by a spring-pressed pawl 93, carried by the load-receiver, which pawl constitutes an abutment for limiting the movement of the stop-segment 91 in the direction of rotation of the load-receiver and for insuring a movement of the track-segment with the receiver. This track-segment has an intermittent limited advancing movement with each intermittent advancing movement of the load-receiver and is retracted to its normal position simultaneously with the ascending movement of the regulator and between intermittent rotative movements of the feed-screw. The counterweight of the track-segment is so disposed as to cause the same to move coincidently with the receiver and a corresponding distance, as will be understood by reference to the drawings.

As a means for retracting the stop-segment 91 simultaneously with the shifting of the belt-shipper from the position shown in Fig. 5 to that shown in Fig. 2 I have provided a stop-segment-actuating rod 94, which is pivotally connected at the rearward end thereof to the depending arm 82 of the belt-shipper and has an elongated slot 95 at the forward end thereof in which is seated a pin 96 on the stop-segment 91, said slot permitting a limited amount of advancing movement of the segment 91 in one direction and the end wall of said slot engaging the pin and retracting the segment when the belt-shipper is moved from the position shown in Fig. 5 to that shown in Fig. 2, as will be readily understood by the drawings, the disposition of the teeth of the ratchet-wheel 92 permitting the same to ride past the free end of the pawl 93 during the retractive movement of the stop-segment 91.

A belt-shipper S³ is provided in operative relation with the fast and loose pulleys of the regulator and is actuated by means of the link 97, connected with said regulator, the connection being such that on the descending movement of the load-receiving end of said regulator the belt will be shifted onto the fast pulley and on the ascending movement of said regulator the belt will be shifted on the loose pulley thereof.

By providing a load-receiver having a circuit of independently-operable sets of closers, substantially as herein described, it will be seen that during the operation of the machine diametrically opposite sets of closers are brought successively into load-receiving and load-discharging positions, respectively, concurrently with each intermittent advancing movement of the receiver and that irrespective of the position of the load-receiver one set of closers will be located in proper position to permit the entrance of the load to the receiver and another diametrically opposite set will be in the proper position to allow the discharge of the load, as will be readily apparent by a comparison of the several figures of the drawings.

Having described my invention, I claim—

1. A weighing-machine embodying a cylindrical load-receiver supported for rotation about a horizontal axis and having its periphery composed of a continuity of independently-operable closers.

2. A weighing-machine embodying a rotative cylindrical load-receiver having a multiplicity of peripherally-disposed pivotally-connected closers whose axes are parallel to the axis of movement of the load-receiver.

3. A weighing-machine embodying a rotative load-receiver having a multiplicity of circumferentially-disposed closers arranged contiguous to one another with the inner free ends of adjacent closers in overlapping relation.

4. A weighing-machine embodying a load-receiver supported for rotative movements and having its periphery composed of a circuit of pivotally-connected sets of closers whose axes are parallel to the axis of the load-receiver.

5. A weighing-machine embodying a rotative load-receiver having a multiplicity of pivotally-connected sets of closers concentrically disposed relatively to the axis of movement of the load-receiver and each set of which comprises two closers having their free ends in overlapping relation and having their axes parallel to each other and to the axis of movement of the load-receiver.

6. A weighing-machine embodying a substantially cylindrical load-receiver supported for rotative movement and having a multiplicity of circumferentially-disposed closers; means for supplying material to the load-receiver at one side the axis thereof to effect a rotative movement of said receiver; means for intermittently interrupting such rotative movement; and means for intermittently opening one or more closers.

7. A weighing-machine embodying a rotative load-receiver having a series of sets of closers arranged in a circuit, and each set comprising two closers each of which is pivotally connected to a closer of the next adjacent set.

8. A weighing-machine embodying a rotative load-receiver having a series of independently-operable sets of closers, each set consisting of two closers pivotally connected at their outer ends to the adjacent closers of the next adjacent sets of closers, respectively.

9. A weighing-machine embodying a rotative load-receiver having a body portion consisting of a series of independently-operable sets of closers, each set comprising two closers normally overlapping each other at their inner ends and pivotally connected at their outer ends to the closers of the next adjacent sets, respectively.

10. A weighing-machine embodying a rotative load-receiver having a series of independently-operable sets of closers, each set consisting of two closers pivotally connected at their outer ends to the adjacent closers of the next adjacent sets, respectively; and means for holding the closers normally in their closed positions.

11. A weighing-machine embodying a rotative load-receiver having a circuit of independently-operable sets of closers, each set consisting of two closers pivotally connected at their outer ends to the adjacent closers of the next adjacent sets, respectively; means for holding the closers normally in their closed positions; and means for opening the sets of closers independently and successively as they arrive, during the rotation of the load-receiver, at predetermined positions.

12. A weighing-machine embodying a load-receiver supported for rotative movements and having a multiplicity of closers arranged in sets substantially concentric to the axis of the receiver, and each set comprising two closers pivotally supported at their outer ends and having their inner ends normally in overlapping relation.

13. A weighing-machine embodying a load-receiver supported for rotative movements and having a multiplicity of closers arranged in sets, and each set comprising two pivotally-supported closers having their inner ends normally in overlapping relation; and a closer-actuator operatively connecting the two closers of each set.

14. A weighing-machine embodying a load-receiver supported for rotative movements and having a multiplicity of closers arranged in sets, and each set comprising two pivotally-supported closers having their inner ends normally in overlapping relation; and means controlled by the rotative movements of the load-receiver for actuating the closers of each set, one slightly in advance of the other, and the sets of closers independently and successively as they arrive, during the rotation of the load-receiver, at predetermined positions.

15. A weighing-machine embodying a load-receiver supported for rotative movements and having a multiplicity of closers arranged in sets, and each set comprising two pivotally-supported closers having their inner ends normally in overlapping relation; an actuating-connector between the two closers of each set; and means located in the path of movement of the connectors and effective, at predetermined points in the rotative movements of the load-receiver, for operating said connectors.

16. A load-receiver having a series of independently-operable pivotally-supported closers having crank-arms; combined with a series of detent devices, each of which normally engages a crank-arm of, and holds, a closer in a closed position.

17. A load-receiver having a series of independently-operable pairs of pivotally-supported closers arranged substantially in the arc of a circle, and the pivot of one closer of each pair having a crank-arm; combined with a series of detent devices each normally engaging a crank-arm of, and holding, a closer in a closed position.

18. A load-receiver supported for rotative movements and having a pivotally-supported closer furnished with a crank-arm; combined with a detent device engaging the crank-arm of said closer normally, and holding the same in a closed position.

19. A load-receiver supported for rotative movements and having a pivotally-supported closer the pivot of which has a crank-arm; combined with a detent device engaging the closer normally, and holding the same in a closed position; and means located in the path of movement of the detent device and effective, at a predetermined point in the rotation of the receiver, for releasing said device from engagement with the crank-arm to facilitate an opening movement of the closer.

20. The combination, with a load-receiver supported for rotative movement, of two closers pivotally supported at their outer ends on the load-receiver near the periphery thereof and having their inner ends normally in overlapping relation; a crank-arm fixed to the pivot of one of said closers; a detent device pivotally supported on the load-receiver in position for normally engaging the crank-arm, to thereby lock the two closers normally in their closed positions; and means located in the path of movement of the detent device and effective, at a predetermined point in the rotation of the receiver, for actuating said device to release, and facilitate an opening movement of, the two closers.

21. The combination, with a load-receiver supported for rotative movement and having an opening, of two closers pivotally supported near their outer ends on the receiver in position to close said opening and having their inner free ends normally in overlapping relation; a crank-arm fixed to the pivot of one of said closers; a detent device normally engaging the crank-arm, for locking the two closers in their closed positions; a detent-actuator located in the path of movement of the detent and effective, at a predetermined point in the rotation of the receiver, for releasing said detent device from engagement with the crank-arm, to facilitate an opening movement of said closer; and an actuating-connector between the two closers and effective, on the opening movement of one closer, for imparting an opening movement to the other closer.

22. A load-receiver comprising two end walls connected by tie-rods, and a cylindrical body composed of a series of closers carried by said tie-rods.

23. A load-receiver comprising two end walls; a series of tie-rods connecting the two end walls; and a series of closers carried by said tie-rods between said end walls and arranged to form the body portion of the receiver.

24. A cylindrical load-receiver consisting of two discous end walls fixedly secured together by tie-rods; and a concentrically-disposed body portion intermediate the end walls and composed of a series of closers carried by said tie-rods and having the inner free ends of the adjacent closers in overlapping relation.

25. In a weighing-machine, the combination, with beam mechanism, of a cylindrical load-receiver supported on the beam mechanism for rotative and reciprocatory movements and comprising two end walls fixedly secured together by tie-rods; and a multiplicity of body sections or closers carried by the tie-rods between the two end walls and arranged in a circuit substantially concentric to the axis of rotation of the load-receiver.

26. In a weighing-machine, the combination, with oscillatory beam mechanism, of a load-receiver supported on the beam mechanism for rotative movement and embodying a circuit of pivotally-supported pairs of closers; a series of detent devices carried by the load-receiver near the periphery thereof and normally engaging and holding the closers in a closed position; and a detent-actuator organized to partake of the oscillatory movement of the beam mechanism and effective, at a predetermined point in the rotation of the load-receiver, for actuating a detent device to release and facilitate the opening movement of a pair of closers.

27. In a weighing-machine, the combination, with a load-receiver having a series of closers, of means embodying two independent reciprocally-effective closer-actuators, one for opening one closer and the other for shutting another closer.

28. In a weighing-machine, the combination, with a load-receiver having a series of closers, of a closer-opening actuator located in position to engage and effect an opening movement of one closer; an independent closer-shutting actuator located in position to engage and effect a closing movement of the other closer independent of the movement of the first-mentioned closer; and means for simultaneously imparting a closer-actuating stroke to one closer-actuator and an ineffective return stroke to the other closer-actuator.

29. In a weighing-machine, the combination, with a load-receiver having two or more closers, of two reciprocally-effective closer-actuators; a regulator located below the load-receiver; and means operatively connecting the closer-actuators and regulator and effective, on the descending movement of said regulator, for imparting a closer-opening movement to one closer-actuator and effective, on the ascending movement of said regulator, for imparting a closer-shutting movement to the other closer-actuator.

30. In a weighing-machine, the combination, with a rotative load-receiver having a series of circumferentially-disposed closers and with means for controlling the rotative movement of said load-receiver, of two reciprocally-effective closer-actuators located one with its working end in position to engage and impart an opening movement to an upper closer, and the other located with its working end in position for imparting a closing movement to a lower closer, and both of which are so connected that an effective movement of one closer will impart a return movement to the other closer; a load-receiving regulator supported below the load-receiver for ascending and descending movements; and means connecting the regulator and the two closers and effective, on the descending movement thereof, for imparting a closer-opening movement to one actuator and, on the ascending movement thereof, for imparting a closer-shutting movement to the other actuator.

31. In a weighing-machine, the combination, with a rotative load-receiver having a series of circumferentially-disposed closers and with means for controlling the rotative movement of said receiver, of two reciprocally-effective closer-actuators; a rocker connecting said two closer-actuators; and means for actuating the rocker, to impart an effective closer-opening stroke to one actuator and an ineffective return or positioning stroke to the other actuator, simultaneously.

32. In a weighing-machine, the combination, with beam mechanism and with a rotative load-receiver supported on the beam mechanism for rotative movements, and having a series of escapement-arms extending outward, radially, from the periphery thereof, of means for supplying material to the load-receiver at one side the axis of rotation thereof; and an escapement actuated by the beam mechanism and effective for controlling the intermittent rotations of said load-receiver.

33. In a weighing-machine, the combination, with oscillatory beam mechanism, of a rotative load-receiver supported on said beam mechanism for oscillatory movement therewith and having a series of escapement-arms extending outward from the periphery thereof; means for supplying material to the load-receiver at one side the axis of rotation thereof, whereby the weight of material will tend to rotate said receiver; an escapement-lever pivotally supported near the middle portion thereof at one side the periphery of the load-receiver and having pallets at opposite ends thereof for alternately engaging the arms of said load-receiver; and means actuated by the beam mechanism, for throwing the pallets of the escapement-lever alternately into and out from engagement with the arms of the load-receiver, to thereby control rotative movements of said receiver.

34. The combination, with beam mechanism, of a rotative load-receiver supported thereon for oscillatory movements and having a series of equidistantly-disposed radial arms extending outward from the periphery thereof; means for supplying material to the load-receiver at one side the axis of movement thereof to effect a rotative movement of said load-receiver; a counterweighted escapement-lever having pallets at opposite ends thereof adapted for alternately engaging the radial arms of the load-receiver; and an escapement-lever actuator pivotally connected at one end to the beam mechanism and having its opposite end in position to engage and actuate the escapement-lever on the oscillatory movements of the load-receiver and beam mechanism.

35. In a weighing-machine, the combination, with oscillatory beam mechanism, of a load-receiver supported for rotative movement on the poising end of the beam mechanism and having a series of circumferentially-disposed closers and also having a series of circumferentially-disposed escapement-arms; means for supplying material to the load-receiver at one side the axis of rotation thereof, to effect a rotative movement of said load-receiver; an escapement-lever having pallets shiftable alternately into the path of movement of the escapement-arms of the load-receiver and adapted for intermittently interrupting and limiting the rotative movement of said receiver; an escapement-lever actuator in operative connection with the beam mechanism; means controlled by the beam mechanism for stopping the supply of material to said load-receiver just preceding the actuation of the escapement-lever by said beam mechanism; means for locking the closers normally in their closed positions; means for unlocking and facilitating an opening movement of the lowermost closer immediately succeeding the operation of the escapement-lever; and means for opening the uppermost closers immediately succeeding the opening movement of the lower closers.

36. In a weighing-machine, the combination, with a rotative load-receiver having a series of circumferentially-disposed pivotally-supported closers, of crank-arms fixed to the pivots of said closers; detent devices for locking the closers normally in their closed positions; means for supplying material to the load-receiver at one side the axis thereof, to thereby facilitate a rotative movement of the receiver by the weight of the load; means for controlling the intermittent rotative movements of the receiver; a closer-actuator shiftable into engagement with the crank-arms of the successive closers; and means for imparting a closer-opening movement to the actuator at a predetermined point in the rotative movements of said receiver.

37. The combination, with beam mechanism, of a load-receiver supported for rotative movements on the poising end of the beam mechanism and having a series of circumferentially-disposed sets of pivotally-supported closers; actuating-connectors between the closers of each set; crank-arms fixed to the pivots of alternating closers; means for supplying material to the load-receiver at one side the axis thereof, to cause the receiver to rotate by the weight of the load; an escapement device controlling the intermittent rotative movements of the load-receiver; a closer-opening actuator shiftable into and out from engagement with the successive crank-arms, intermediate two intermittent rotations of the receiver, to thereby effect an opening movement of a pair of closers; and a gravitative regulator supported below the load-receiver and connected with the closer-opening actuator in such manner as to control the movements thereof.

38. The combination, with beam mechanism, of a load-receiver supported on the poising end of the beam mechanism for rotative movements and having a series of circumferentially-disposed closers; means for supplying material to the load-receiver at one side of its axis, to facilitate a rotative movement of the load-receiver; and a track-plate for normally retaining the majority of the closers in a closed position during the rotative movements of the load-receiver and having depressed portions for facilitating an opening movement of two of the closers.

39. The combination, with beam mechanism, of a load-receiver supported on the poising end of the beam mechanism for rotative movements and having a series of circumferentially-disposed closers; means for supplying material to the load-receiver at one side of its axis, to facilitate a rotative movement of the load-receiver; a substantially circular track-plate for normally retaining the majority of the closers in a closed position during the rotative movements of the load-receiver and having two depressed portions for facilitating an opening movement of the two closers; a regulator or discharge-conveyer supported below the load-receiver for oscillatory movement; and means controlled by said regulator, on the ascending and descending movements thereof, for closing and opening, respectively, independent closers.

40. In a weighing-machine, the combination, with oscillatory beam mechanism and with a load-receiver supported thereon, of a feed-case having a discharge-opening located above the receiver; a rotative force-feeder journaled in said feed-case; a fast and a loose pulley on the shaft of said feeder and adapted to be driven by a belt; means in connection with the feeder-shaft and adapted during the rotation of said feeder for vibrating the feeder and feed-case simultaneously; a belt-shipper having a depending arm in normal engagement with a by-pass on the beam mechanism; a belt-shipper actuator effective, on the descent of the load-receiver and on the release of the arm from the by-pass, for moving the belt-shipper in one direction; a regulator supported for oscillatory movement below the load-receiver; two reciprocally-effective stop members operative with the belt-shipper and regulator, respectively, for locking the belt-shipper in its feed-stopping position when the regulator is depressed and for locking the regulator in its elevated position when the belt-shipper is in its feed-starting position; and means controlled by the beam mechanism for shifting the belt-shipper to its feed-starting position on the ascent of the regulator.

41. In a weighing-machine, a rotatably-supported load-receiver having a series of pairs of closers each pair consisting of two pivotally-supported closers; combined with actuating-toggles pivotally connecting the two closers of the successive pairs of closers; a fixed plate having a substantially circular track bearing against the knuckles of the several closers, for holding said closers normally in their closed position during the major portion of the rotative movement of the receiver; and means for effecting opening and closing movements of the closers.

42. In a weighing-machine, a substantially cylindrical load-receiver supported for rotative movements and having a pair of pivotally-supported circumferentially-disposed closers; combined with a toggle comprising two links pivotally connected together at their inner ends, and one of said links being fixed at its outer end to the pivot of one closer, and the other link being pivotally connected at its outer end to the inner end of the adjacent closer; a roller mounted on the knuckle of said toggle; a fixed plate having a track or runway for the rolls on the toggles and adapted for normally retaining the closers in their closed positions during the major portion of the rotative movement of the receiver and having two diametrically opposite depressed portions for facilitating an opening movement of said closers and for assisting the closing movements thereof.

43. In a weighing-machine, the combination, with a cylindrical load-receiver having a multiplicity of circumferentially-disposed pivotally-supported closers, of a fixed plate having a track for retaining the closers normally in their closed positions during the rotative movement of the receiver; means for supplying material to the load-receiver, at one side the axis of movement thereof, to effect a rotative movement of said receiver; means for intermittently interrupting the supply of material; and means for locking the load-receiver against movement while material is being supplied thereto, and for releasing and facilitating a rotative movement of said receiver on the interruption of the supply.

44. In a weighing-machine, the combination, with a rotative load-receiver having a multiplicity of circumferentially-disposed closers, of a track-plate having a depressed peripheral portion; closer-actuating toggles in connection with said closers, bearing on the periphery of the track-plate during the rotative movement of the receiver; a counterweighted track-segment normally bridging the depressed portion of the track-plate and supported to have a limited advancing movement with the load-receiver; a force-feeder for supplying a stream of material to the load-receiver at one side the axis of movement thereof, to effect a rotative movement of said receiver; a feed-controller in operative relation with the force-feeder and adapted for starting and stopping, intermittently, said feeder; and means controlled by the feed-controller, on the feeder-stopping movement thereof, for retracting the track-segment.

FRANCIS H. RICHARDS.

Witnesses:
F. N. CHASE,
ANDREW FERGUSON.